US009375664B2

(12) United States Patent
Perz et al.

(10) Patent No.: US 9,375,664 B2
(45) Date of Patent: Jun. 28, 2016

(54) FILTER ASSEMBLY

(71) Applicant: Maxitrol Company, Southfield, MI (US)

(72) Inventors: Daniel James Perz, Windsor (CA); Bonnie Kern-Koskela, Birmingham, MI (US); Jeffrey L. Scheuher, Livonia, MI (US)

(73) Assignee: MAXITROL COMPANY, Southfield, MI (US)

( * ) Notice: Subject to any disclaimer, the term of this patent is extended or adjusted under 35 U.S.C. 154(b) by 280 days.

(21) Appl. No.: 13/917,309

(22) Filed: Jun. 13, 2013

(65) Prior Publication Data
US 2013/0334127 A1    Dec. 19, 2013

Related U.S. Application Data

(60) Provisional application No. 61/659,028, filed on Jun. 13, 2012.

(51) Int. Cl.
*B01D 29/01* (2006.01)
*B01D 29/07* (2006.01)

(52) U.S. Cl.
CPC ............ *B01D 29/014* (2013.01); *B01D 29/071* (2013.01)

(58) Field of Classification Search
CPC ........................... B01D 29/014; B01D 29/071
USPC .......................................... 210/446, 447, 451
See application file for complete search history.

(56) References Cited

U.S. PATENT DOCUMENTS

| | | | |
|---|---|---|---|
| 2,798,613 A * | 7/1957 | Tinker ........................... | 210/446 |
| 3,075,337 A | 1/1963 | Andreae | |
| 3,505,795 A | 4/1970 | Wurtenberg | |
| 3,520,111 A | 7/1970 | Revell et al. | |
| 3,556,298 A * | 1/1971 | Huebner et al. ............... | 210/131 |
| 3,870,495 A | 3/1975 | Dixson et al. | |
| 3,941,571 A | 3/1976 | Getzin | |
| 4,008,060 A | 2/1977 | Andreae | |
| 4,056,375 A | 11/1977 | Ringel et al. | |
| 4,135,900 A | 1/1979 | Westlin et al. | |
| 4,154,587 A | 5/1979 | Gerok | |
| 4,365,981 A | 12/1982 | McDonough | |
| 4,701,197 A | 10/1987 | Thornton et al. | |
| 4,738,778 A | 4/1988 | Taki et al. | |
| 4,798,676 A | 1/1989 | Matkovich | |
| 4,799,944 A | 1/1989 | Dixon et al. | |
| 4,877,433 A | 10/1989 | Oshitari | |
| 5,397,632 A | 3/1995 | Murphy, Jr. et al. | |
| 5,820,645 A | 10/1998 | Murphy, Jr. | |
| 6,200,368 B1 | 3/2001 | Guerin et al. | |
| 6,447,566 B1 | 9/2002 | Rivera et al. | |

(Continued)

*Primary Examiner* — Benjamin Kurtz
(74) *Attorney, Agent, or Firm* — Howard & Howard Attorneys PLLC

(57) ABSTRACT

A filter assembly includes a housing defining a cavity with an inlet and an outlet in communication with the cavity and establishing a flow path from the inlet to the outlet. A filter is disposed in the cavity between the inlet and the outlet. The filter includes a vertex extending transversely to the flow path for diffusing the flow of fluid and increasing the surface area of the filter. The filter includes a pair of legs spaced from each other and each extending across the flow path from the vertex to the housing. The legs extend transversely to each other at the vertex with one of the legs extending along a first arcuate path from the vertex to the housing and the other of the legs extending along a second arcuate path different than the first arcuate path from the vertex to the housing.

20 Claims, 3 Drawing Sheets

(56) References Cited

U.S. PATENT DOCUMENTS

| | | |
|---|---|---|
| 6,638,330 B1 | 10/2003 | Bergami |
| 6,758,878 B2 | 7/2004 | Choi et al. |
| 6,818,037 B2 | 11/2004 | Tanaka et al. |
| 7,156,898 B2 | 1/2007 | Jaisinghani |
| 2006/0150816 A1 | 7/2006 | Jaisinghani |
| 2007/0209343 A1 | 9/2007 | Cuvelier |
| 2008/0017038 A1 | 1/2008 | Wu |
| 2009/0142234 A1 | 6/2009 | Tatarchuk et al. |

\* cited by examiner

FILTER ASSEMBLY

CROSS-REFERENCE TO RELATED APPLICATIONS

The subject patent application claims priority to and all the benefits of U.S. Provisional Patent Application No. 61/659,028 filed on Jun. 13, 2012, which is herein incorporated by reference in its entirety.

BACKGROUND OF THE INVENTION

1. Field of the Invention

The present invention relates to a filter assembly for filtering fluids flowing therethrough. Specifically, the present invention relates to a filter assembly including a housing an a filter element disposed in the housing.

2. Description of the Related Art

Filter assemblies are used in many types of systems for filtering impurities from a fluid flowing through the system. One such system is a fuel gas system that handles fuel gases such as liquefied petroleum (LP), natural gas, propane, and fuel-air mixes. The filter assembly is used, for example, to filter particulates to protect controls, such as regulators, automatic shut-off valves, etc., from particulate contamination.

The filter assembly typically includes a housing defining an inlet for receiving the fluid and an outlet for outputting the fluid. The housing defines a cavity between the inlet and the outlet and receives a filter element in the cavity. The fluid flows through the filter element and the filter element filters the fluid as the fluid flows from the inlet toward the outlet.

One goal in the design of filter assemblies is to maximize the filtering capability and efficiency of the filter assembly while minimizing the restriction of flow through the filter assembly. A restriction in flow corresponds with a pressure drop between the inlet and the outlet of the filter assembly. Specifically, the pressure drop is a decrease in pressure from the inlet to the outlet due to friction as the fluid flows through the housing, and in particular, due in part to friction between the flowing fluid and the filter element. The pressure drop is dependent on the velocity of the fluid at the filter element and the largest pressure drop occurs at the highest point of velocity of the flow of fluid through the filter element.

Since the fluid flows through the filter element during filtration, the filter element causes a pressure drop between the inlet and the outlet of the filter assembly. There remains an opportunity to reduce the pressure drop caused by the filter element while maximizing the filtering capacity and efficiency of the filter assembly.

SUMMARY OF THE INVENTION AND ADVANTAGES

A filter assembly comprises a housing defining a cavity with an inlet and an outlet in communication with the cavity and establishing a flow path from the inlet to the outlet. A filter is disposed in the cavity between the inlet and the outlet. The filter includes a vertex extending transversely to the flow path for diffusing the flow of fluid and increasing the surface area of the filter. The filter includes a pair of legs spaced from each other and each extending across the flow path from the vertex to the housing. The legs extend transversely to each other at the vertex with one of the legs extending along a first arcuate path from the vertex to the housing and the other of the legs extending along a second arcuate path different than the first arcuate path from the vertex to the housing.

By diffusing the flow of fluid, the vertex reduces the pressure drop through the filter assembly. The vertex diffuses the flow of fluid across a greater area of the filter element. Specifically, a portion of the flow of fluid flows through the vertex, however, the vertex directs portions of the flow of fluid to the legs. This results in a more evenly distributed flow of fluid through a greater area of the filter element. Said differently, the vertex more evenly distributes the velocity of the flow of fluid at the filter element by decreasing the otherwise high velocity at the vertex and increasing the otherwise low velocity at the legs. By diffusing the flow of fluid across a greater area of the filter element, the vertex decreases the maximum velocity of the flow of fluid through the filter element and thus decreases the pressure drop resulting in a greater flow rate.

In addition, the vertex increases the surface area of the filter element exposed to the flow of fluid and exposes a greater amount of the flow of fluid to a greater surface area of the filter element. As a result, the vertex increases the capacity and efficiency of the filter assembly while increasing the flow rate.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
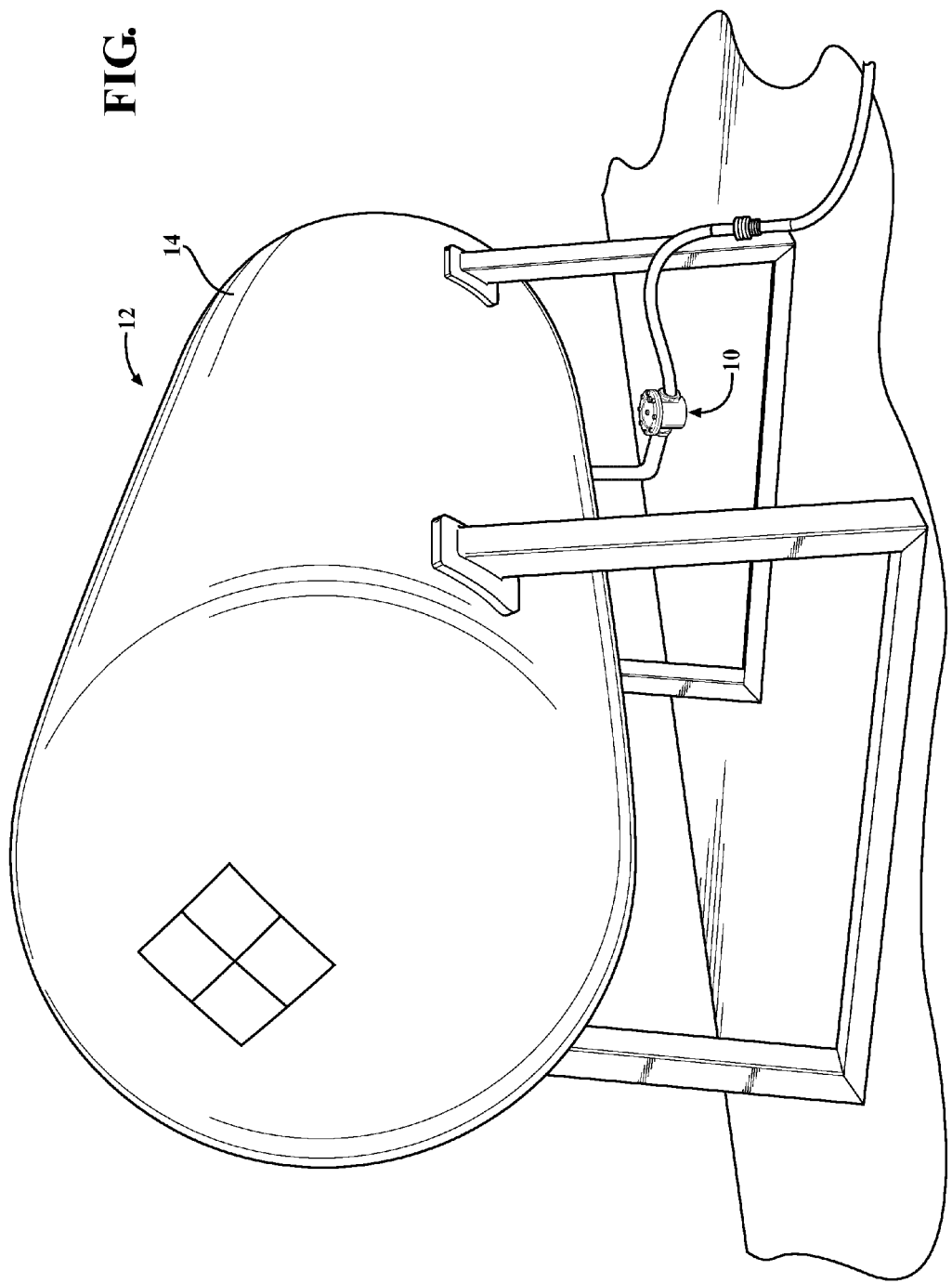
FIG. 1 is a perspective view of a filter assembly connected to a fuel gas tank.

With reference to the Figures, wherein like numerals indicate like or corresponding parts throughout the several views, a filter assembly is generally shown at 10. The filter assembly 10 may be used with any type of system 12 for filtering impurities from a fluid flowing through the filter assembly 10. The filter assembly 10 is typically configured to filter fluid that is in a gaseous state and, alternatively, is configured to filter fluid in a liquid state. The filter assembly 10, for example, is generally used with fuel gases. Fuel gases typically include, but are not limited to, liquefied petroleum (LP), natural gas, propane, gas-air mixes, sewer gas, and air. In FIG. 1, the system 12 is further defined as a fuel gas system and the filter assembly 10 is shown, for example, on an outlet of a fuel gas tank 14. The filter assembly 10 is used, for example, to filter particulates to protect downstream controls from particulate contamination. The controls may include regulators, auto shut-off valves, etc.

Figure 3:
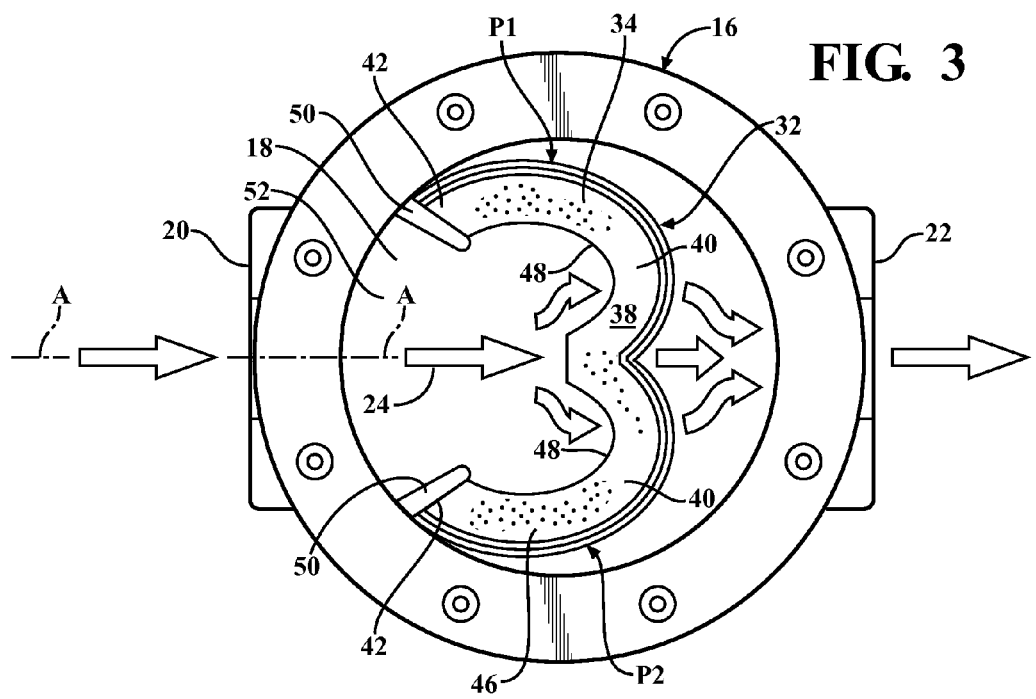
FIG. 3 is a top view of the filter assembly with a cover removed.

The filter assembly 10 includes a housing 16 defining a cavity 18 with an inlet 20 and an outlet 22 in communication with the cavity 18 and establishing a flow path 24 from the inlet 20 to the outlet 22, as shown in FIG. 3. The fluid flows along the flow path 24 from the inlet 20 to the outlet 22.

Figure 2:
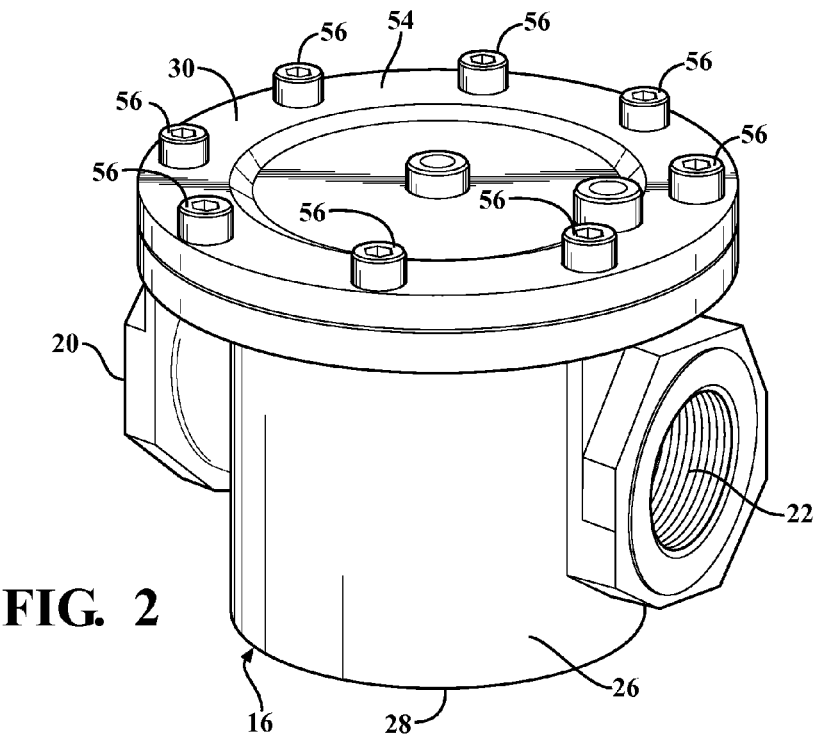
FIG. 2 is a perspective view of the filter assembly.
Figure 4:
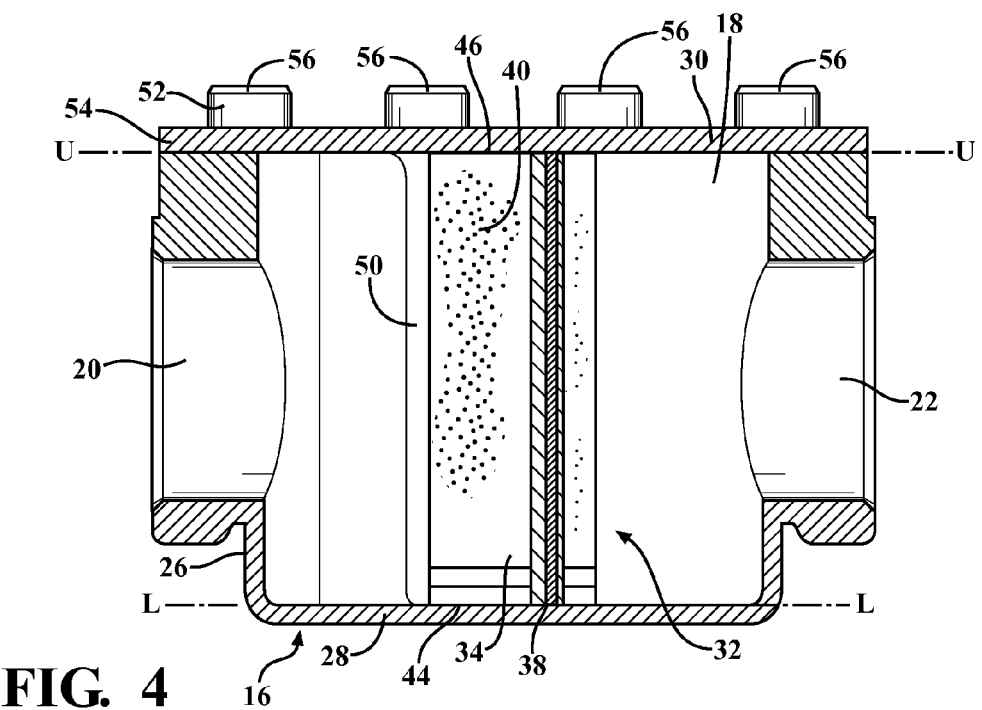
FIG. 4 is a cross-sectional view of the filter assembly.

With reference to FIGS. 2-4, the housing 16 includes a body 26 having a generally cylindrical configuration defining the cavity 18, in part, and defining the inlet 20 and the outlet 22. It is appreciated that the body 26 may be of any other shape such as, but not limited to square, rectangular, hexagonal, or any other geometric shape, without departing from the scope of the present invention.

With reference to FIG. 4, the housing 16 includes a lower wall 28 and an upper wall 30 connected to the body 26 in the cavity 18. The lower wall 28 and the upper wall 30 are spaced from each other between the inlet 20 and the outlet 22 with the flow path 24 therebetween.

With reference to FIGS. 3 and 4, a filter element 32 is disposed in the cavity 18 between the inlet 20 and the outlet 22 for filtering and separating impurities from fluid as the fluid flows along the flow path 24. The filter element 32 is also referred to in industry as a filter mat.

Figure 5:
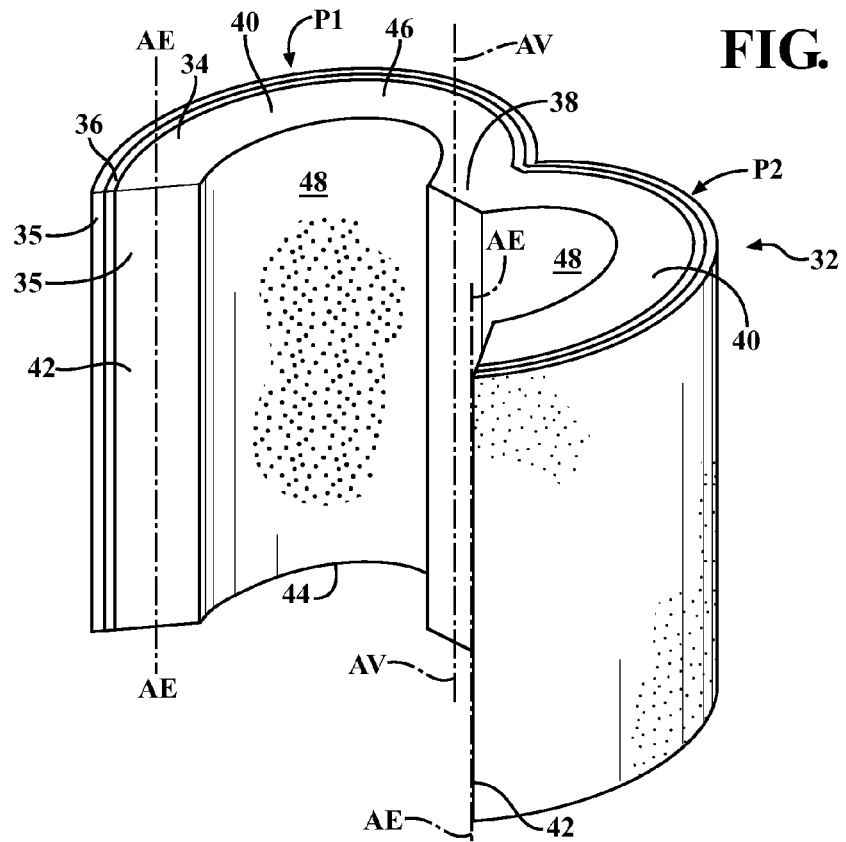
FIG. 5 is a perspective view of a filter element of the filter assembly.

With reference to FIGS. 4 and 5, the filter element 32 typically includes a filter media 34 and a frame 36. The filter media 34 is typically a thermoplastic polymer. For example, the filter element 32, i.e., the filter media 34, includes a polysulfone material such as, for example, a polyethersulfoe (PES) material. PES, for example, provides dimensional stability to the filter element 32 as well as filtering ability. For example, PES can remain dimensionally stable for long-term, continuous use without significant physical deterioration or dimensional change. PES is well suited for particulate removal and is available is in a variety of pore sizes such that it can be used for coarse particulate removal in pre-filtration applications as well as in fine, final-filter applications for clarification. However, it should be appreciated that the filter element 32 can include other suitable materials without departing from the scope of the present disclosure.

In the filter element 32 shown in FIG. 5, for example, the filter media 34 includes two layers 35 and the frame 36 is typically a screen mesh encapsulated between the two layers 35. Alternatively, the frame 36 can be, for example, an exterior frame connected to at least one end 42 of the filter media 34. The frame 36 provides dimensional stability to the filter media 34 and/or seals against the housing 16. The frame 36 can be of any suitable material such as, for example, metal or plastic.

With reference to FIGS. 3-5, the filter element 32 includes a vertex 38 and a pair of legs 40 spaced from each other and each extending across the flow path 24 from the vertex 38 to the housing 16. The filter element 32 extends from the lower wall 28 to the upper wall 30. Specifically, the vertex 38 and the legs 40 define a lower surface 44 abutting the lower wall 28 and an upper surface 46 abutting the upper wall 30. The legs 40 each extend from the vertex 38 to an end 42 and the ends 42 of the legs 40 abut the body 26 of the housing 16 from the lower wall 28 to the upper wall 30. In other words, the filter element 32 spans the entire flow path 24 in the cavity 18. The filter element 32 typically seals to the housing 16 along the lower surface 44, the upper surface 46, and the ends 42 of the legs 40.

With reference to FIG. 5, the ends 42 of the legs 40 typically extend along parallel axes AE from the lower wall 28 to the upper wall 30 transversely to the lower wall 28 and the upper wall 30. The vertex 38 typically extends along an axis AV parallel with the axes AE of the ends 42 of the legs 40. Alternatively, although not shown in the Figures, the axes AE of the ends 42 can be non-parallel relative to each other and/or the axes AE of the ends 42 can be non-parallel relative to the axis AV of the vertex 38.

With reference to FIG. 4, the lower surface 44 extends in a lower plane L and the upper surface 46 extends in an upper plane U. Typically, the lower plane L and the upper plane U are parallel. The vertex 38 extends from the lower wall 28 to the upper wall 30 transversely to the lower wall 28 and the upper wall 30. For example, the axes AV, AE of the vertex 38 and the ends 42 are perpendicular to the lower plane L and the upper plane U.

With reference to FIGS. 3 and 4, the vertex 38 extends transversely to the flow path 24 for diffusing the flow of fluid and increasing the surface area of the filter element 32. By diffusing the flow of fluid, the vertex 38 reduces the pressure drop through the filter assembly 10.

The vertex 38 diffuses the flow of fluid across a greater area of the filter element 32. Specifically, a portion of the flow of fluid flows through the vertex 38, however, the vertex 38 directs portions of the flow of fluid to the legs 40. This results in a more evenly distributed flow of fluid through a greater area of the filter element 32. Said differently, the vertex 38 more evenly distributes the velocity of the flow of fluid at the filter element 32 by decreasing the otherwise high velocity at the vertex 38 and increasing the otherwise low velocity at the legs 40. By diffusing the flow of fluid across a greater area of the filter element 32, the vertex 38 decreases the maximum velocity of the flow of fluid through the filter element 32 and thus decreases the pressure drop resulting in a greater flow rate.

The vertex 38 is typically aligned with the inlet 20. Said differently, the inlet 20 extends about a central axis A and the vertex 38 is disposed along the central axis A for diffusing the flow of fluid entering cavity 18 through the inlet 20. Specifically, the area of highest velocity of the flow of fluid through the filter element 32 is at the central axis A of the inlet 20. Since the vertex 38 is disposed along the central axis A, the vertex 38 diffuses the flow of fluid at the point of highest velocity of the flow of fluid to maximize the reduction in pressure drop resulting in a greater flow rate.

As set forth above, the vertex 38 increases the surface area of the filter element 32 exposed to the flow of fluid. Specifically, the vertex 38 extends along the flow of fluid, which increases the surface area of the filter element 32 exposed to the flow of fluid. In addition, by diffusing the flow of fluid across a greater area of the filter element 32, the vertex 38 exposes a greater amount of the flow of fluid to a greater surface area of the filter element 32.

The legs 40 extend transversely to each other at the vertex 38. The legs 40 are typically mirror images of each other relative to the vertex 38.

The legs 40 extend in a non-linear path from the vertex 38 to the housing 16. As one example, one of the legs 40 extends along a first arcuate path P1 from the vertex 38 to the housing 16 and the other of the legs 40 extending along a second arcuate path P2 different than the first arcuate path P1 from the vertex 38 to the housing 16. This configuration can be described as M-shaped. Alternatively, for example, the non-linear path can include angular paths, folded paths, etc.

With reference to the first and second arcuate paths P1, P2 shown in FIG. 3, the legs 40 each define a concave surface 48 facing the inlet 20. The vertex 38 is disposed between the concave surfaces 48 of the legs 40. The concave surfaces 48 provide additional direction to the flow of fluid that has already been diffused by the vertex 38.

The ends 42 of the legs 40 are engaged with the housing 16. The housing 16 is typically configured to engage the legs 40 to retain the filter element 32 in the cavity 18 when fluid flows along the fluid path. For example, the housing 16 includes fingers 50 extending into the cavity 18 and engaging the ends 42 for retaining the filter element 32 in the housing 16.

With reference to FIG. 3, the housing 16 defines an opening 52 between the inlet 20 and the outlet 22 and includes a cover 54 removeably covering the opening 52. The opening is in communication with the flow path 24 for removeably disposing the filter element 32 in the cavity 18. Fasteners 56, for example, secure the cover to the body 26. The fasteners can be, for example, screws, bolts, clips, rivets, etc. The cover 54 includes the upper wall 30.

A seal (not shown) is typically disposed between the cover 54 and the body 26 for sealing the cover to the body 26 for preventing external elements from influencing cavity 18. In other words, the seal prevents contaminants from entering the cavity 18. The seal enables the cavity 18 to maintain a pressure therein and prevents escape of fluids the filter assembly 10. The seal may be, for example, o-rings, washers, and the like.

The filter assembly 10 includes a connecting device (not shown) coupled to each of the inlet 20 and the outlet 22 for coupling the filter assembly 10 into the system 12. The connecting device may include a connecting pipe, a coupler, a flange, or any other appropriate mechanism for coupling the filter assembly 10 to the system 12. The connecting device is the only component that varies between different systems. In other words, the other components of the filter assembly 10 are typically the same, i.e., common, between various systems. This is beneficial by simplifying inventory and ordering, and reducing potential for error. Additionally, costs associated with manufacturing and testing of the filter assembly 10 may be reduced. Tooling to manufacture filter assemblies for a plurality of different systems can be commonized. Testing equipment, including testing fixtures may also be commonized. Commonization of tooling and testing equipment can significantly reduce costs and complexity to produce the filter assembly 10.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A filter assembly comprising:
    a housing defining a cavity with an inlet and an outlet in communication with said cavity and establishing a flow path from said inlet to said outlet; and
    a filter disposed in said cavity between said inlet and said outlet;
    said filter including a vertex extending transversely to said flow path for diffusing the flow of fluid and increasing the surface area of the filter;
    said filter including a pair of legs spaced from each other and each extending across said flow path from said vertex to said housing; and
    said legs extending transversely to each other at said vertex with one of said legs extending along a first arcuate path from said vertex to said housing and the other of said legs extending along a second arcuate path different than said first arcuate path from said vertex to said housing.

2. The filter assembly as set forth in claim 1 wherein said inlet extends about a central axis and wherein said vertex is disposed along said central axis for splitting the flow of fluid entering cavity through said inlet.

3. The filter assembly as set forth in claim 1 wherein said legs each define a concave surface facing said inlet.

4. The filter assembly as set forth in claim 3 wherein said vertex is disposed between said concave surfaces of said legs.

5. The filter assembly as set forth in claim 1 wherein said legs are mirror images of each other relative to said vertex.

6. The filter assembly as set forth in claim 1 wherein said housing includes a lower wall and an upper wall in said cavity and spaced from each other between said inlet and said outlet, said filter extending from said lower wall to said upper wall.

7. The filter assembly as set forth in claim 6 wherein said vertex extends transversely to said lower wall and said upper wall.

8. The filter assembly as set forth in claim 7 wherein said legs each extend from said vertex to an end, said ends of said legs extending along parallel axes from said lower wall to said upper wall transversely to said lower wall and said upper wall.

9. The filter assembly as set forth in claim 8 wherein said vertex and said legs define a lower surface abutting said lower wall and an upper surface abutting said upper wall and wherein said ends of said legs abut said housing from said lower wall to said upper wall.

10. The filter assembly as set forth in claim 1 wherein said legs each extend from said vertex to an end and said ends of said legs are engaged with said housing.

11. The filter assembly as set forth in claim 1 wherein said legs each extend from said vertex to an end and wherein said housing includes fingers extending into said cavity and engaging said ends for retaining said filter in said housing.

12. The filter assembly as set forth in claim 1 wherein said legs each extend from said vertex to an end, said ends of said legs extending along parallel axes.

13. The filter assembly as set forth in claim 12 wherein said vertex extends along an axis parallel with said axes of said ends of said legs.

14. The filter assembly as set forth in claim 1 wherein said housing defines an opening between said inlet and said outlet and includes a cover removeably covering said opening, said opening being in communication with said flow path for removeably disposing said filter in said cavity.

15. The filter assembly as set forth in claim 1 wherein said filter includes polyethersulfone.

16. A filter element for disposition in a cavity of housing of a filter assembly, said filter element comprising:
    a vertex; and
    a pair of legs spaced from each other and each extending from said vertex to an end, said ends of said legs being spaced from each other and extending transversely to each other at said vertex;
    said vertex and said legs extending from a lower surface to an upper surface for abutting said housing in said cavity along said lower surface and said upper surface, said lower surface extending in a lower plane and said upper surface extending in an upper plane parallel with said lower plane;
    one of said legs extending along a first arcuate path from said vertex to said end of said one of said legs and the other of said legs extending along a second arcuate path different than said first arcuate path from said vertex to said end of said other of said legs.

17. The filter element as set forth in claim 16 wherein said vertex extends along an axis from said lower surface to said upper surface and said ends each extend along an axis with said axes of said ends being parallel with said axis of said vertex.

18. The filter element as set forth in claim 17 wherein said axes of said vertex and said ends, respectively, are perpendicular to said lower plane and said upper plane.

19. The filter element as set forth in claim 16 wherein said legs each define a concave surface facing a common direction with said vertex disposed between said concave surfaces.

20. A filter element for disposition in a cavity of housing of a filter assembly, said filter element comprising,
    a filter media; and
    a frame, said filter media secured to the frame;

wherein the filter element is configured such that along a cross-section taken parallel with a direction of fluid flow through the filter element in operation, the filter element cross-section consists essentially of a vertex centrally disposed to the fluid flow, and bounded by a pair of legs spaced from each other and extending along respective arcuate paths across the fluid flow from the vertex, wherein each leg of the pair of legs forms a concave recess in the direction of the fluid flow such that the leg terminates at an end point up-stream along the fluid flow direction relative to the vertex, and the concave recess includes a portion extending downstream along the fluid flow direction relative to the vertex.

\* \* \* \* \*